Patented May 8, 1951

2,552,478

UNITED STATES PATENT OFFICE 2,552,478

PREPARATION OF THERAPEUTIC SUBSTANCE

Elmer W. Cook, New York, and Samuel Kushner, Nanuet, N. Y., and Philip Hotchkiss Moss, Stamford, Conn., assignors to American Cyanamid Company, New York, N. Y., a corporation of Maine No Drawing. Application February 12, 1947, Serial No. 728,203

1 Claim. (Cl. 260—239.1)

This invention relates to certain new organic compounds and methods of preparing them. Certain of the compounds possess remarkable utility as anti-biotic substances of the general type of the penicillins. Whereas in the production of penicillin by fermentation processes it is necessary to use large quantities of fermentable materials and use such products as may be fortuitously formed by the particular growth organism used in a specific case, by means of our invention it is possible to synthesize materials which are closely related to the penicillins in their anti-biotic activities, but certain of which possess their own independent advantages. The compounds may be made to fit a particular need. More particularly this invention relates to compounds having the general formula:

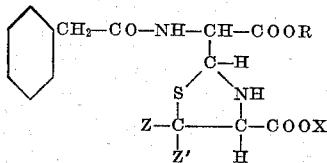

where R represents an alkyl radical, aralkyl radical, or other ester forming residue, X represents hydrogen, alkyl, or a salt forming radical, as for instance sodium, or other of the alkali metals, and where Z and Z' represent hydrogen, or a lower alkyl group, which groups are not necessarily the same; and the compounds formed therefrom by the azlactonization, or attempted azlactonization of the formula compounds. When an attempt is made to form the azlactone of the formula compounds, it may be that an additional internal shift of linkages occurs to give compounds that are tautomeric with the azlactone of the compound as set forth.

We do not intend that this invention, its disclosure, and claims, should be restricted to a particular formula description, but rather should include the compounds and the azlactones, or tautomers which are formed under the conditions as described. The compounds of our invention may be produced by the reaction of an alpha formyl phenaceturic ester with cysteine or a beta substituted cysteine. Particular utility as an antibiotic exists where the beta substituents are dimethyl, i. e., beta-mercaptovaline.

After condensing the alpha formyl phenaceturic ester with the beta-mercaptovaline, or such similar compounds as may be used in a particular preparation, the ester containing product is hydrolyzed, then treated with benzoyl chloride and pyridine for azlactone formation. Where the beta-mercapto-valine is used, the compound may be purified by any of the standard methods used for the purification of penicillin G.

Whereas in the specific examples the hydrochloride of mercapto valine is disclosed, the free material may be used if convenient, or other salts may be used. The amounts of alkali should be appropriately corrected. The greater solubility of the hydrochloride renders it particularly easy to form the solutions. Various esters of the alpha-formyl phenaceturic esters may be used but for the specific examples shown the ethyl ester was chosen as particularly convenient. Obviously any alkyl or aralkyl or cycloalkyl or other equivalent ester could be used in stoichiometrically equivalent proportions. The di-beta-substituted cysteine was chosen because it yields products closely related to particular natural products; however, any of the lower alkyl groups may be used as substituents to form related compounds each having its own particular utility.

Preparation of alpha-formyl phenaceturic esters are described at length in Patent No. 2,394,967 to Samuel Kushner.

Cysteine itself is a well known compound.

The invention itself will now be described in detail by specific examples, and certain of the intermediates while not herein specifically claimed will be disclosed, as methods of their preparation may not be known to certain of those otherwise familiar with the prior art:

EXAMPLE I

*Beta-mercapto valine*

A mixture of 192 grams of ethyl alpha-nitro-dimethylacrylate and 1 to 2 grams of piperidine was prepared, and 138 grams of benzyl mercaptan was slowly added with stirring. The reaction which took place was exothermic, and the rate of addition of the benzyl mercaptan was adjusted so as to maintain the temperature of the reaction mixture at about 50° C. The product was then allowed to stand overnight at room temperature.

The crude product, ethyl alpha-nitro-beta-benzylmercapto isovalerate, was then reduced with tin and dry HCl in methanol, at 50° C. The tin double salt crystallized out and was filtered off. The filtrate was evaporated under a vacuum at 60–70° C. to less than about half its original volume. Water was then added and another crop of the crystalline tin salt collected. The total quantity of tin salt, 520 grams, was dissolved in 90% methanol, and sodium bicarbonate was added to a pH of 6 to 7. The solution was then treated with hydrogen sulfide to precipitate tin. The tin sulfide was filtered off, the pH again adjusted to between 6 and 7 and the solution again treated with hydrogen sulfide. This procedure was repeated until all of the tin had been removed.

The filtrate was then evaporated to dryness under a vacuum, the residue dissolved in 300 cc. of methanol, and the resulting solution warmed and filtered to remove sodium chloride. After evaporation of the filtrate to dryness, 200 grams of viscous syrup was obtained which represented a yield of 63.6% of beta-benzyl mercaptovaline ethyl ester hydrochloride based on the ethyl alpha-nitrodimethylacrylate.

Approximately 45 grams of the beta-benzylmercaptovaline ester hydrochloride prepared as just described was refluxed for three hours with 200 cc. of 6 N hydrochloric acid. The solution was then treated with activated charcoal and then filtered. The free beta-benzyl mercaptovaline was precipitated by treating the solution with sodium hydroxide to a pH of 6. The mixture was cooled, filtered and the precipitate washed with a little cold water, alcohol, and ether. A yield of 39 grams (71%) of beta-benzyl mercaptovaline melting at 208–209° C. was obtained.

A solution of 20 grams of beta-benzyl mercaptovaline in 300 cc. of liquid ammonia was placed in a flask fitted with a stirrer. An amount, 4.3 grams, of metallic sodium was added in small proportions until a blue color persisting at least for 20 minutes was produced. An equivlent amount of ammonium chloride was then added in small proportions. Excess ammonia was then evaporated off by first warming the reaction mixture on a water bath, then placing it under a vacuum for several hours. The residue was slurrried up in 150 cc. of methanol. Dry HCl was passed in until the reaction mixture was acid to Congo red and the mixture stirred until all of the pink particles had dissolved or turned white. The reaction mixture was then filtered to remove sodium and ammonium chlorides. Upon evaporation of the filtrate under vacuum, 17 grams of crude beta-mercapto valine hydrochloride was obtained. This product was further purified by redissolving in a minimum amount of methanol and then filtered and evaporated to dryness under vacuum. Fifteen grams of beta-mercaptovaline hydrochloride, a white solid product, melting with decomposition at 170–175° C. was obtained.

EXAMPLE II

*Reaction of beta mercaptovaline and alpha formyl phenaceturic ester*

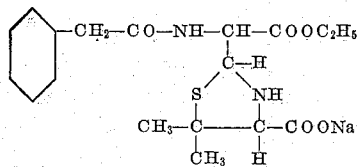

A solution was prepared containing 0.43 gram of beta mercapto valine hydrochloride dissolved in 20 cc. of methyl alcohol in which had been previously dissolved 0.11 g. of sodium. The solution was cooled in an ice bath, and 0.57 gram of alpha formyl phenaceturic ester (ethyl) was added thereto. The solution was allowed to stand in the open for one hour, acquiring room temperature. The solvent was removed in a vacuum, and the product isolated as the sodium salt of penicilloic ester, i. e., the sodium salt of the ethyl ester of alpha (2-(4-carboxy 5,5 dimethyl) thiazolidinyl) phenaceturic acid.

EXAMPLE III

*Anti-biotic substance*

1.35 g. of crude ester from the above example was dissolved in 15 cc. of methanol, containing 0.22 g. of 85% pure potassium hydroxide, allowed to stand 12 hours, and the solvent evaporated in a vacuum desiccator The residue was dissolved in 10 cc. of cold pyridine, treated at about 0° C. with 0.6 g. benzoyl chloride, allowed to stand 30 minutes, then thrown into an iced buffered aqueous solution at a pH of 3. The solution was extracted with chloroform, the chloroform layer titrated cold with a dilute sodium bicarbonate solution to a pH of 6.2, the aqueous layer separated and frozen, and evaporated lyophilically. The powder thus formed exhibited an activity of 3 Oxford units per mg. when tested by bioassay for penicillin content. The powder product was light yellow, water soluble, and did not give a color test for the —SH group when tested with ferric chloride. The conditions used, presumably, would tend to azlactonize the substituted phenaceturic ester, but in view of the ease with which the product is decomposed, such is not certain, nor capable of rigorous proof. The product obtained may be further purified, to obtain a product of higher antibiotic activity by chromatographic adsorption, or any of the other purification processes well known to those in the field.

EXAMPLE IV

A solution of 02.7 g. of alpha-formyl phenaceturic butyl ester in 5 cc. of ethanol was reacted for two days at room temperature with a solution of 0.16 g. of cysteine hydrochloride and 0.19 g. of anhydrous potassium acetate in 7 cc. of water. The solid was filtered off and then washed with 15 cc. of 50% ethanol. After triturating with dilute hydrochloric acid the product was again filtered and washed thoroughly with water. A yield of 0.14 g. of alpha-(2-(4-carboxy) thiazolidinyl) phenaceturic butyl ester was obtained.

In place of a mixture of ethanol and water, any other suitable inert solvent such as methanol, propanol isopropanol, butanol, dioxane, etc., and water may be used. Similarly, in place of the butyl ester of alpha-formyl phenaceturic acid, there may be used other esters such as, propyl amyl, octyl, decyl, dodecyl, octadecyl, and the like.

The reaction time varies somewhat with the temperature, dilution and other similar factors. Ordinarily, from twelve hours to about six days is required to bring about the reaction to a suitable stage of completion. It will be understood, however, that smaller yields of product are obtainable in a much shorter period of time, even after a few minutes' reaction.

EXAMPLE V

*Reaction of beta mercapto valine and alpha formyl phenaceturic ester*

One mole of d,l mercapto valine and 1.2 moles of sodium acetate were dissolved in a minimum of glacial acetic acid. Thereto was added one mole of alpha formyl phenaceturic ester (ethyl) dissolved in glacial acetic acid. The mixture was kept at 40° to 50° C. for about 5 hours, the mixture was frozen and the acid removed in vacuum while frozen. The residual solids were washed with dry ether, the solid was taken up in methanol, ten moles of 20% sodium hydroxide added, then after 12 hours acidified, evaporated to dryness in vacuum extracted with methanol, evaporated to dryness again, dissolved in butanol, filtered and evaporated in vacuum. The product was the free alpha (2(4 carboxy-5,5 dimethyl) thiazolidinyl) phenaceturic acid, as a pale yellow heavy oil.

We claim:

The process of preparing a therapeutic agent which comprises dissolving approximately 1.35 parts of the sodium salt of the ethyl ester of alpha (2-(4-carboxy-5,5-dimethyl) thiazolidinyl) phenaceturic acid in approximately 15 parts by volume of methanol having dissolved therein approximately 0.22 part of potassium hydroxide, allowing to stand approximately 12 hours, evaporating the solvent in vacuo, redissolving in approximately 10 parts of cold pyridine, adding thereto approximately 0.6 part of benzoyl chloride while at approximately 0° C., allowing to stand for approximately 30 minutes, adding the thus prepared materials to an iced aqueous buffer at a pH of approximately 3, extracting the thus formed solution with chloroform, separating the chloroform layer, titrating the chloroform layer while cold with dilute sodium bicarbonate solution to a pH of approximately 6.2, separating the thus formed aqueous layer, freezing said aqueous layer, and removing the water therefrom while in the frozen state, thereby forming the desired therapeutic product.

ELMER W. COOK.
SAMUEL KUSHNER.
PHILIP HOTCHKISS MOSS.

REFERENCES CITED

The following references are of record in the file of this patent:

UNITED STATES PATENTS

| Number | Name | Date |
|---|---|---|
| 2,394,967 | Kushner | Feb. 12, 1946 |
| 2,430,455 | Crooks | Nov. 11, 1947 |
| 2,461,949 | Wintersteiner et al. | Feb. 15, 1949 |
| 2,480,466 | Harris et al. | Aug. 30, 1949 |

OTHER REFERENCES

Lilly Report CMR–L–III, Feb. 12, 1944, p. 2.
Parke Davis Report CMR–PD–VIII, Feb. 15, 1944, p. 1.
Michigan Report CMR–B–I, Feb. 16, 1944, p. 7.
Merck Report CMR–XII–a, Feb. 29, 1944, pp. 4 and 5.
Merck Report CMR–M–XII–b, Feb. 29, 1944, pp. 3 and 9.
Dept. Agr. Report CMR–C–III, Mar. 4, 1944, p. 6.
Parke Davis Report CMR–PD–IX, Mar. 15, 1944, p. 2.
Merck Report CMR–M–XV–c, Mar. 31, 1944, pp. 7, 12 and 13.
Merck Report CMR–M–23, Apr. 29, 1944, p. 4.
Michigan Report CMR–B–5, June 1, 1944, pp. 3 and 4.
Merck Report CMR–M–33, June 30, 1944, pp. 19 and 20.
Merck Report CMR–M–47, Oct. 31, 1944, p. 30.
Merck Report CMR–M–50, Nov. 30, 1944, pp. 32 and 33.
Parke Davis Report CMR–PD–23, Apr. 15, 1945, p. 2.
Science, Dec. 21, 1945, vol. 102, pp. 627–629.
Du Vigneaud et al.: Science, vol. 104, Nov. 8, 1946, pp. 431 to 433.
The Chemistry of Penicillin (1949), pp. 3, 63, 851, 859 to 869, 1051, 1052, 1055 to 1057, 1060 and 1061.